(12) United States Patent
Shimada et al.

(10) Patent No.: US 8,522,078 B2
(45) Date of Patent: Aug. 27, 2013

(54) TROUBLE COPING METHOD FOR INFORMATION TECHNOLOGY SYSTEM

(75) Inventors: Kuniaki Shimada, Kawasaki (JP); Yasuhide Matsumoto, Kawasaki (JP); Yukihiro Watanabe, Kawasaki (JP); Yuji Wada, Kawasaki (JP); Masazumi Matsubara, Kawasaki (JP); Kenji Morimoto, Kawasaki (JP); Akira Katsuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 12/409,273

(22) Filed: Mar. 23, 2009

(65) Prior Publication Data
US 2009/0249130 A1   Oct. 1, 2009

(30) Foreign Application Priority Data
Mar. 27, 2008   (JP) ................ 2008-084594

(51) Int. Cl.
  *G06F 11/00*   (2006.01)
(52) U.S. Cl.
  USPC ............................. 714/26; 714/48; 714/57
(58) Field of Classification Search
  USPC .............................. 714/26, 46, 48, 57
  See application file for complete search history.

(56) References Cited

U.S. PATENT DOCUMENTS

| | | | | |
|---|---|---|---|---|
| 5,127,005 | A * | 6/1992 | Oda et al. ................ | 714/26 |
| 5,337,320 | A * | 8/1994 | Kung ...................... | 714/26 |
| 6,012,152 | A * | 1/2000 | Douik et al. ............ | 714/26 |
| 6,343,236 | B1* | 1/2002 | Gibson et al. .......... | 700/79 |
| 6,415,395 | B1* | 7/2002 | Varma et al. .......... | 714/37 |
| 6,650,949 | B1* | 11/2003 | Reichenbach et al. ........ | 700/79 |
| 7,379,846 | B1* | 5/2008 | Williams et al. ............ | 702/185 |
| 7,441,152 | B2* | 10/2008 | Kato ............................. | 714/26 |
| 7,644,046 | B1* | 1/2010 | Keeton et al. ................ | 705/400 |
| 2003/0171897 | A1* | 9/2003 | Bieda et al. ................. | 702/185 |
| 2004/0078667 | A1* | 4/2004 | Salem .......................... | 714/26 |
| 2006/0174167 | A1* | 8/2006 | Ito ................................. | 714/48 |
| 2007/0245174 | A1* | 10/2007 | Gale et al. .................... | 714/57 |
| 2008/0004841 | A1 | 1/2008 | Nakamura | |
| 2008/0034258 | A1* | 2/2008 | Moriya et al. ................ | 714/57 |

FOREIGN PATENT DOCUMENTS

| JP | A 9-16430 | 1/1997 |
|---|---|---|
| JP | A 2000-76071 | 3/2000 |
| JP | 2001-265474 | 9/2001 |
| JP | A 2003-15877 | 1/2003 |
| JP | 2004-192153 | 7/2004 |
| JP | 2006-313399 | 11/2006 |
| JP | 2006-343987 | 12/2006 |
| JP | 2008-9842 | 1/2008 |

OTHER PUBLICATIONS

Japanese Office Action and English translation issued in Japanese Application No. 2008-084594 on Mar. 6, 2012.

* cited by examiner

*Primary Examiner* — Bryce Bonzo
*Assistant Examiner* — Elmira Mehrmanesh
(74) *Attorney, Agent, or Firm* — Greer, Burns & Crain, Ltd.

(57) ABSTRACT

A trouble coping apparatus includes an incident registration section which registers information about an incident which has solved a problem, a solution knowledge generation section which generates trouble solution knowledge from the incident information, a risk registration section which registers risk items which are materials for judging appropriateness of selection of a work candidate, with the trouble solution knowledge, a risk evaluation section which generates navigation information showing a trouble solution procedure from the trouble solution knowledge, and a solution procedure display section which displays the navigation information.

17 Claims, 17 Drawing Sheets

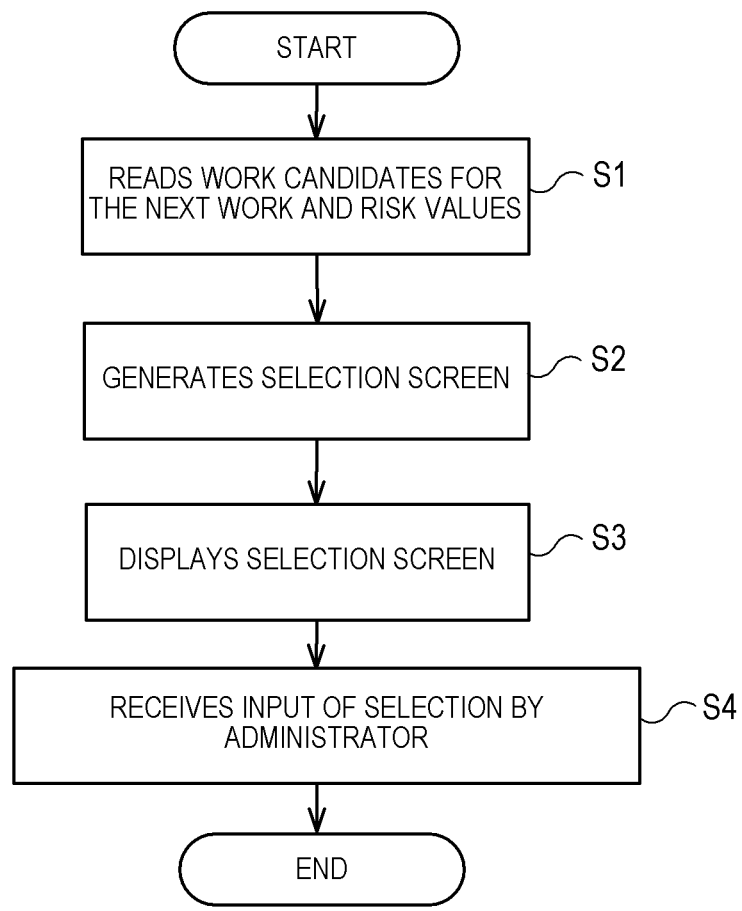

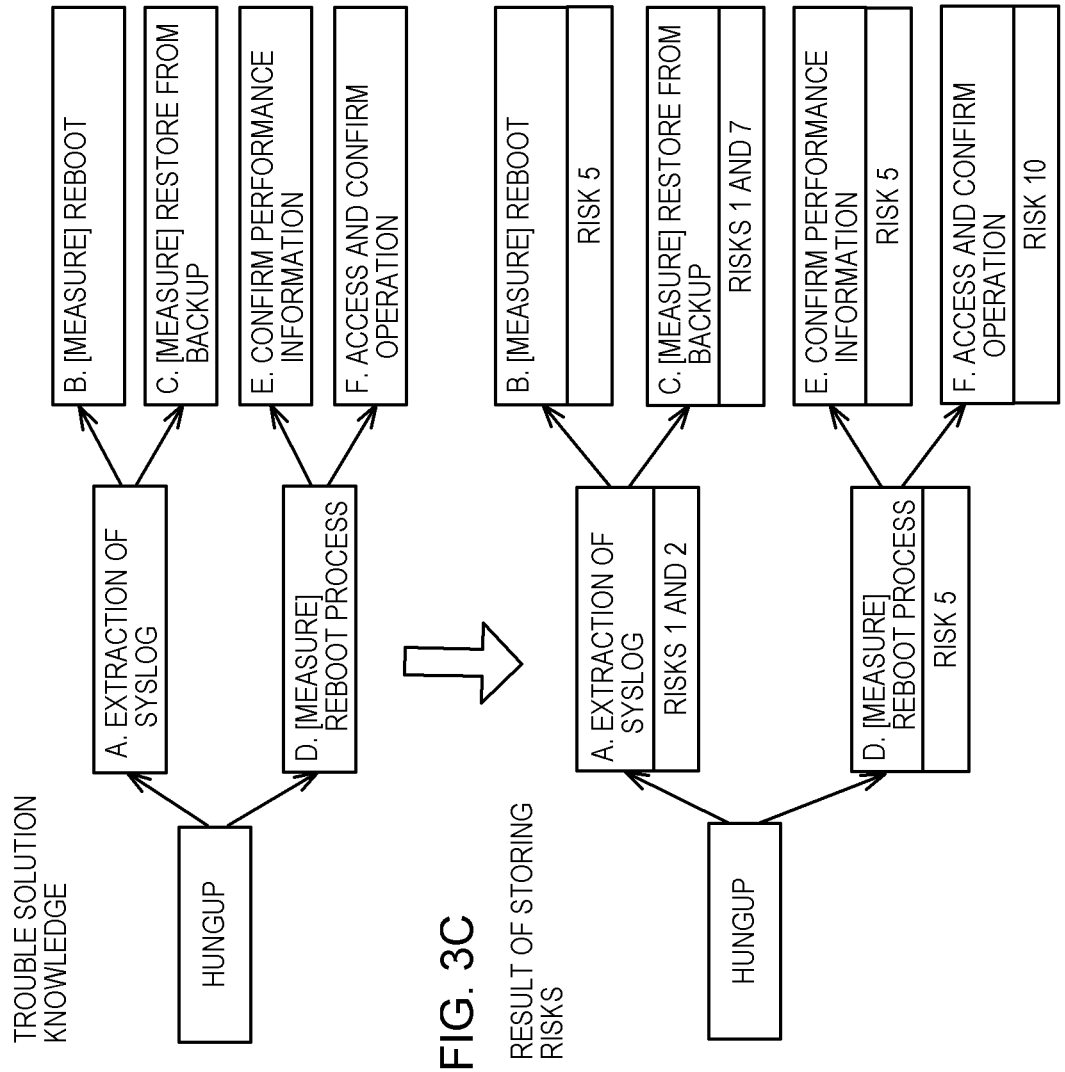
FIG. 3A TROUBLE SOLUTION KNOWLEDGE
FIG. 3C RESULT OF STORING RISKS
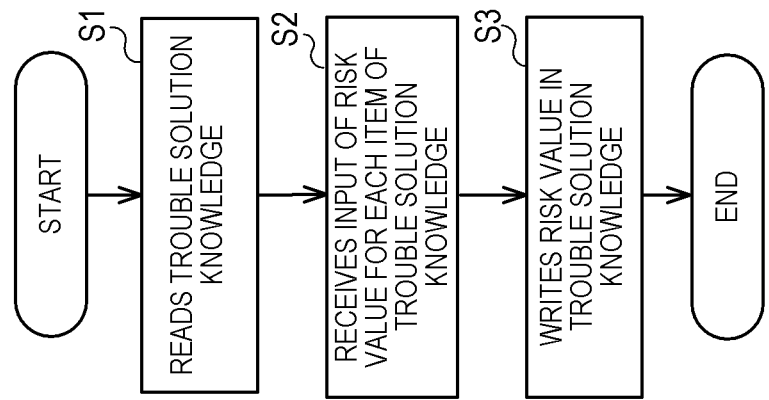
FIG. 3B

FIG. 8A

| INCIDENT ID | INC007-0911-0047 |
|---|---|
| PHENOMENON | HUNGUP |
| LAYER | APPLICATION |
| PRODUCT | INTERSTAGE |
| EXTRACTED DATA [1] | CORE |
| ACQUISITION START | 2007-09-06 19:00:00 |
| ACQUISITION END | 2007-09-06 20:00:00 |
| EVALUATION POSITION | HUNGUP OF NECESSARY PROCESS |
| MEASURE | REBOOT |
| MEASURE START | 2007-09-07 09:00:00 |
| MEASURE END | 2007-09-07 09:10:00 |
| RESULT OF MEASURE | FAILURE |
| EXTRACTED DATA [1] | SYSLOG |
| ACQUISITION START | 2007-09-11 11:05:00 |
| ACQUISITION END | 2007-09-11 11:10:00 |
| EVALUATION POSITION | "ERRONEOUS DELETION OF NECESSARY FILE" |
| MEASURE | RESTORE FROM BACKUP |
| MEASURE START | 2007-09-12 03:00:00 |
| MEASURE END | 2007-09-12 07:00:00 |
| RESULT OF MEASURE | SUCCESS |
| MEASURE COMPLETION TIME | 2007-09-14 12:00:00 |

|  | WORK CANDIDATE | TIME REQUIRED |
|---|---|---|
| APPLY | EXTRACTION OF SYSLOG | 10MIN |
| APPLY | [MEASURE] REBOOT PROCESS | 5MIN |

| | WORK CANDIDATE | TIME REQUIRED | OCCURRENCE PROBABILITY | PRIORITY RANKING |
|---|---|---|---|---|
| APPLY | EXTRACTION OF SYSLOG | 27.5MIN | 80% | 1 |
| APPLY | [MEASURE] REBOOT PROCESS | 35MIN | 20% | 2 |

FIG. 11A
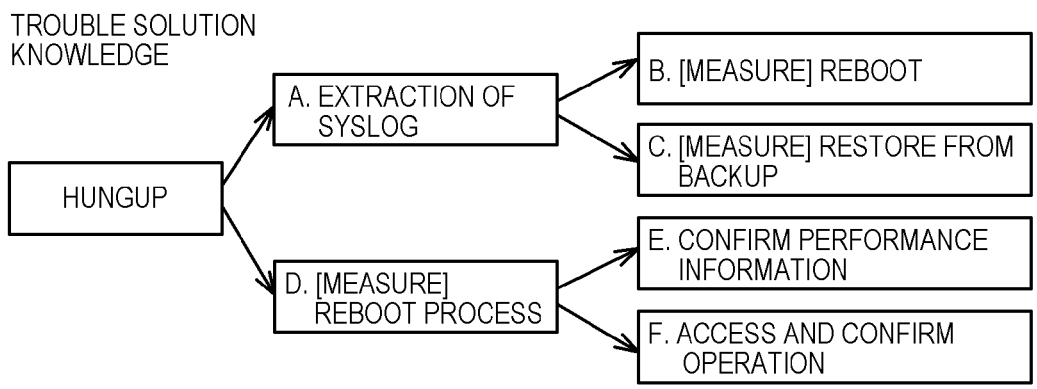
FIG. 11B
INCIDENTS IN THE PAST
| INCIDENT NUMBER | TROUBLE SOLUTION KNOWLEDGE EXECUTION HISTORY | SHORTEST SUCCESSFUL ROUTE |
|---|---|---|
| 1 | D→A→B→C | A→C |
| 2 | D→A→C | A→C |
| 3 | A→C | A→C |
| 4 | A→B | A→B |
| 5 | A→D→E | D→E |
FIG. 11C
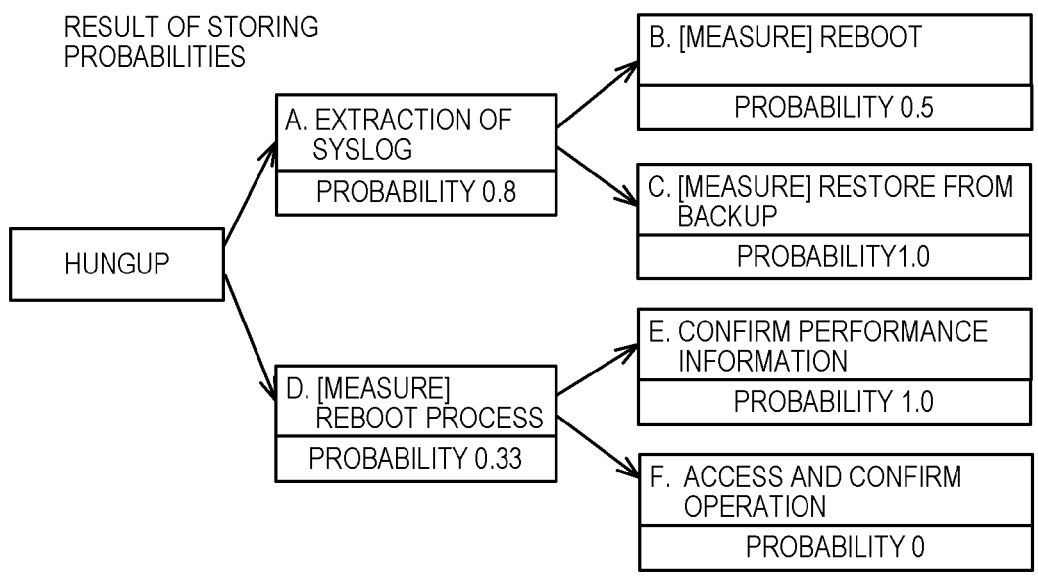

FIG. 12A
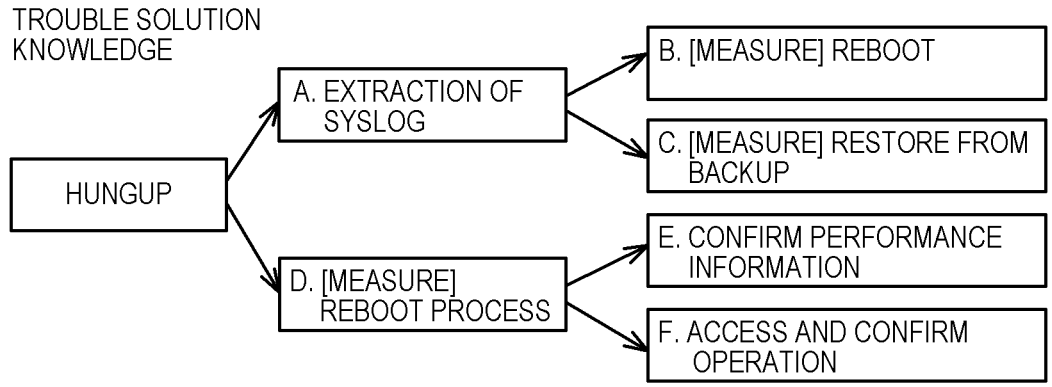
TROUBLE SOLUTION KNOWLEDGE
FIG. 12B
INCIDENTS IN THE PAST
| INCIDENT NUMBER | TROUBLE SOLUTION KNOWLEDGE EXECUTION HISTORY | SHORTEST SUCCESSFUL ROUTE |
|---|---|---|
| 1 | D→A→B→C | A→C |
| 2 | D→A→C | A→C |
| 3 | A→C | A→C |
| 4 | A→B | A→B |
| 5 | A→D→E | D→E |
FIG. 12C
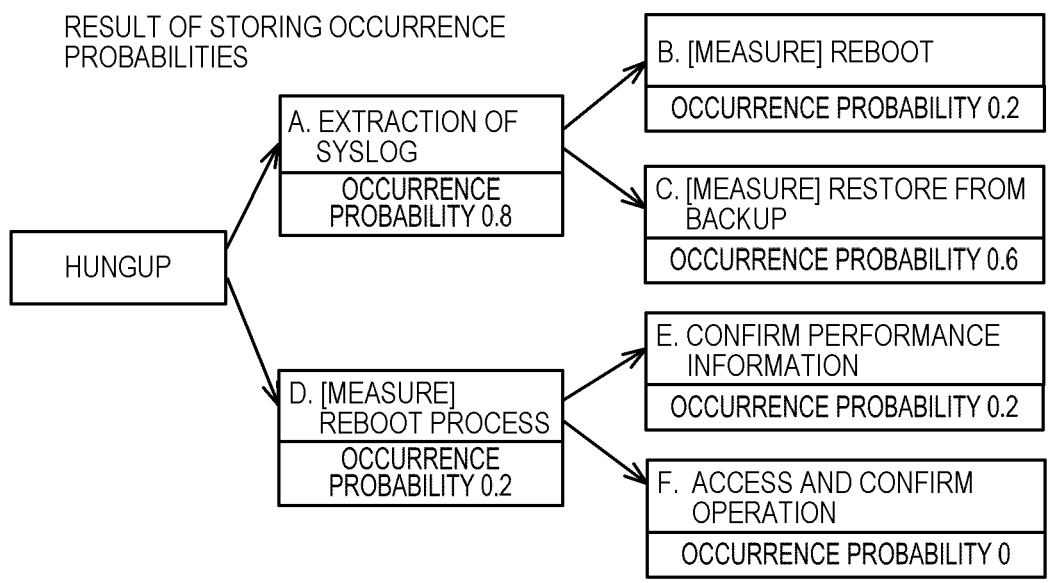
RESULT OF STORING OCCURRENCE PROBABILITIES

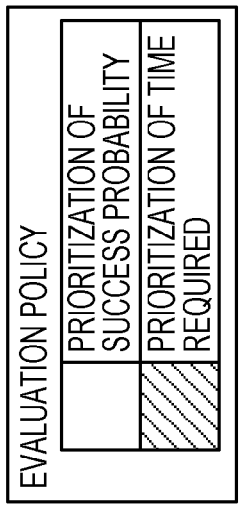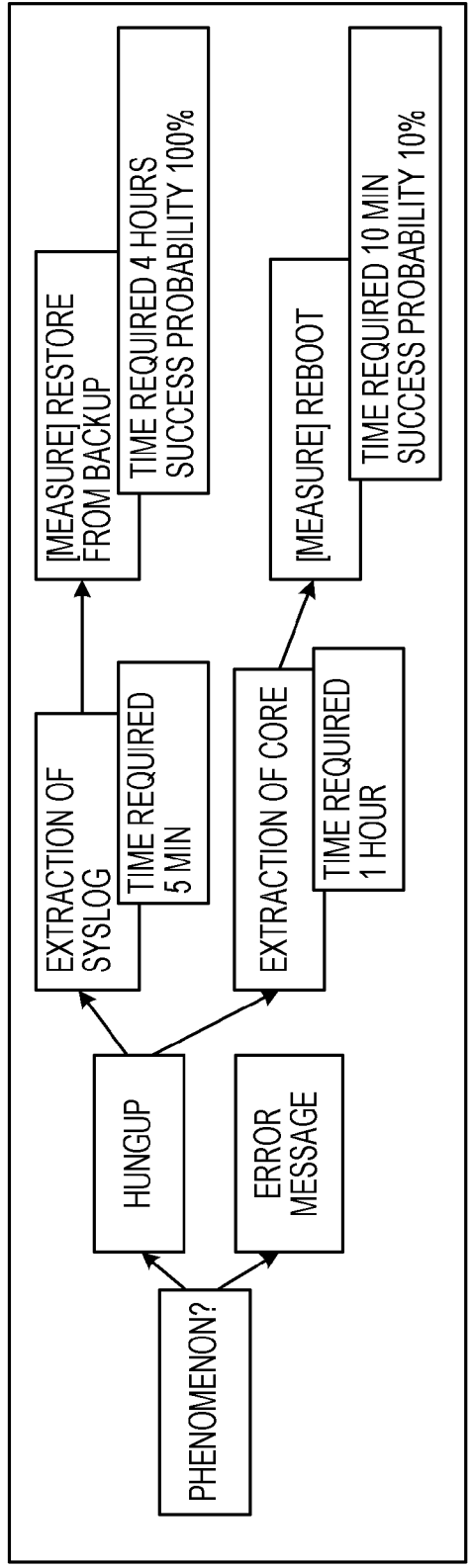
FIG. 16A
FIG. 16B
FIG. 16C

TROUBLE COPING METHOD FOR INFORMATION TECHNOLOGY SYSTEM

CROSS-REFERENCE TO RELATED APPLICATIONS

This application is based upon and claims the benefit of priority of the prior Japanese Patent Application No. 2008-084594, filed on Mar. 27, 2008, the entire contents of which are incorporated herein by reference.

FIELD

The embodiments discussed herein are related to an apparatus and method for coping with a fault in an information technology system, and a program therefor.

BACKGROUND

Now, information technology (herein after IT) problems can be solved on the basis of information about the phenomenon (symptom) of a problem and the like.

In such a problem solving process, if there are multiple coping method work candidates, it is difficult to determine which work candidate to begin with, that is, the priority order of the options. For example, it is required to select which candidate to try first between coping method work candidates, such as "reboot" and "restore from backup". However, the prioritization of options is performed on the basis of the experience of a maintenance/administration person (hereinafter simply referred to as an administrator) of an IT system, and determination on which selection is optimal depends on the administrator's experience and skill.

Disclosure as below is shown in Japanese Laid-open Patent Publication No. 2000-076071. This system is provided with a case aligning means 20 for hierarchically classifying past cases through a case preparing part, editing part, classification preparing part and editing part and adding attributes such as explanation descriptions to respective classifications. A question display part is provided for inputting the declaration contents of a user, retrieving these contents from a case data base through a retrieval part, collating them with the respective classification attributes and cases, finding the similarity of respective classifications and cases, and displaying information for questioning which classification the case declared by the user belongs to from a question display, based on the similarity for the user. Cases are specified by successively applying the display of questions to the slave classifications of the classification answered by the user.

SUMMARY

According to an aspect of an embodiment, a trouble coping apparatus includes an incident registration section which registers information about an incident which has solved a problem, a solution knowledge generation section which generates trouble solution knowledge from the incident information, a risk registration section which registers risk items which are materials for judging appropriateness of selection of a work candidate, with the trouble solution knowledge, a risk evaluation section which generates navigation information showing a trouble solution procedure from the trouble solution knowledge, and a solution procedure display section which displays the navigation information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2A illustrates a processing flowchart of displaying candidates for the next work;

FIG. 2B illustrates an display example of candidates for the next work;

FIG. 3A illustrates an example of solution knowledge before risk registration.

FIG. 3B illustrates a processing flowchart of risk registration procedure.

FIG. 3C illustrates a solution knowledge after the risk registration;

FIG. 8A illustrates an example of an incident;

FIG. 11A illustrates an example of solution knowledge without a risk item in the case of having selected probability as a risk item;

FIG. 11B illustrates an example of incidents in the past in the case of having selected probability as a risk item;

FIG. 11C illustrates an display example of trouble solution knowledge in the case of having selected probability as a risk item;

FIG. 12A illustrates an example of solution knowledge without a risk item in the case of having selected occurrence probability as a risk item;

FIG. 12B illustrates an example of incidents in the past in the case of having selected occurrence probability as a risk item;

FIG. 12C illustrates an display example of trouble solution knowledge in the case of having selected occurrence probability as a risk item;

FIG. 16A illustrates a display example for selecting the priority order of evaluation policies;

FIG. 16B illustrates a display example of a visualized flow of solution procedure in the case of having added time required and probability (success probability);

FIG. 16C illustrates a display example of a next work candidate in the case of having added time required and probability (success probability);

DESCRIPTION OF EMBODIMENTS

Figure 1:
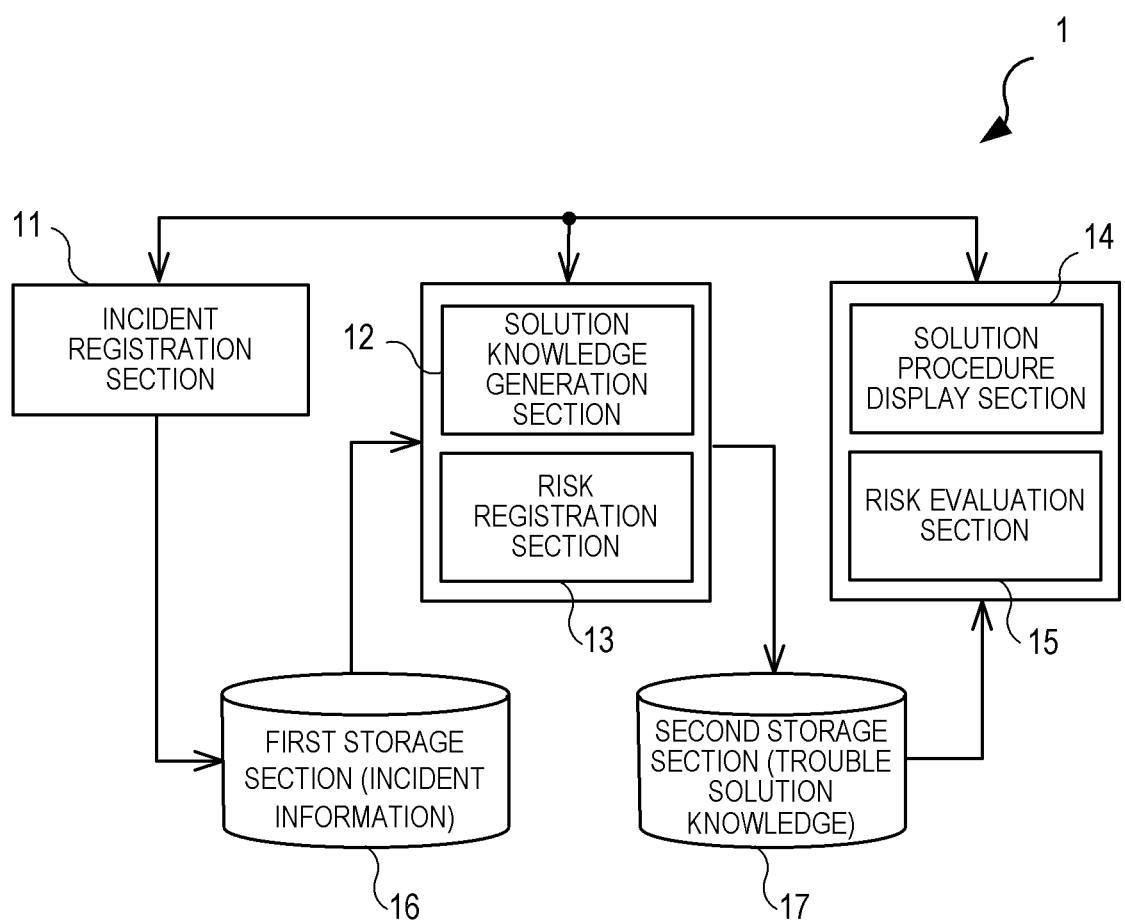
FIG. 1 illustrates a block configuration diagram of a trouble coping apparatus according to first embodiment.

FIG. 1 illustrates a block configuration diagram of a trouble coping apparatus according to first embodiment. A trouble coping apparatus (hereinafter referred to as a coping apparatus) 1 shown in the whole of FIG. 1 is an apparatus for performing operations management of an IT system not shown, and it is a computer apparatus provided with a CPU, a main storage (memory), an auxiliary storage (magnetic disk), an input interface connected to an input device such as a keyboard, and an output interface connected to an output device such as a display.

The coping apparatus 1 is installed within the IT system or installed outside the IT system without being communication-connected to the IT system. The coping apparatus 1 has an incident registration section 11, a solution knowledge generation section 12, a risk registration section 13, a solution procedure display section 14, a risk evaluation section 15, a first storage section 16 and a second storage section 17.

The incident registration section 11 registers an incident which has solved a trouble in the IT system, and stores the registered incident information into the first storage section 16 of the auxiliary storage. Here, an incident means a history of trouble solution knowledge in the past applied to troubles in the IT system.

The solution knowledge generation section 12 generates trouble solution knowledge (hereinafter simply referred to as solution knowledge) from the incident stored and registered with the first storage section 16 by the incident registration section 11.

The risk registration section 13 registers risk items, which are judgment criteria for appropriateness of a work candidate to be selected, with the solution knowledge generated by the solution generation section 12, and stores the registered solution knowledge in the second storage section 17 of the auxiliary storage. Here, a risk is material for judging the appropriateness of selection of a work candidate. If selection of a work candidate fails, a user of the IT system suffers disadvantages such as that a lot of time is required for solution of a trouble. Therefore, such material is called a risk. Risk items include time required, cost, probability and occurrence probability. A risk value indicates the degree of risk. If a risk item is time required, the risk value indicates time required, and the degree is indicated by whether it is long or short. If a risk item is cost, the risk value indicates cost, and the degree is indicated by whether high or low.

The risk evaluation section 15 generates navigation information which shows a trouble solution procedure from the solution knowledge.

The solution procedure display section 14 displays the navigation information generated by the risk evaluation section 15 on a display not shown.

FIG. 2A illustrates a processing flowchart of displaying candidates for the next work. The risk registration section 13 adds risk values to work candidates, and causes the solution procedure display section 14 to display the work candidates on the display (not shown). In the description about flowcharts below, the numeral following "S" indicates a step number.

The flowchart shown in FIG. 2A will be described.

At step S1, work candidates for the next work and risk values are read from second storage section 17.

At step S2, a work candidate selection screen for displaying the work candidates and the risk values is generated.

At step S3, the selection screen generated by execution of step S2 is displayed on the display.

At step S4, input of selection of a work candidate is received from an IT system administrator who has looked at the selection screen displayed at step S3.

FIG. 2B illustrates an display example of candidates for the next work as a processing result after execution of step S3. As shown in the figure, work candidates and risk values are displayed on the display. Thereby, the IT system administrator can easily determine which work he should select next.

FIG. 3A illustrates an example of solution knowledge before risk registration. FIG. 3A illustrates the phenomenon of a problem, extracted data and measures for solving the trouble according to a solution procedure.

Figure 6:
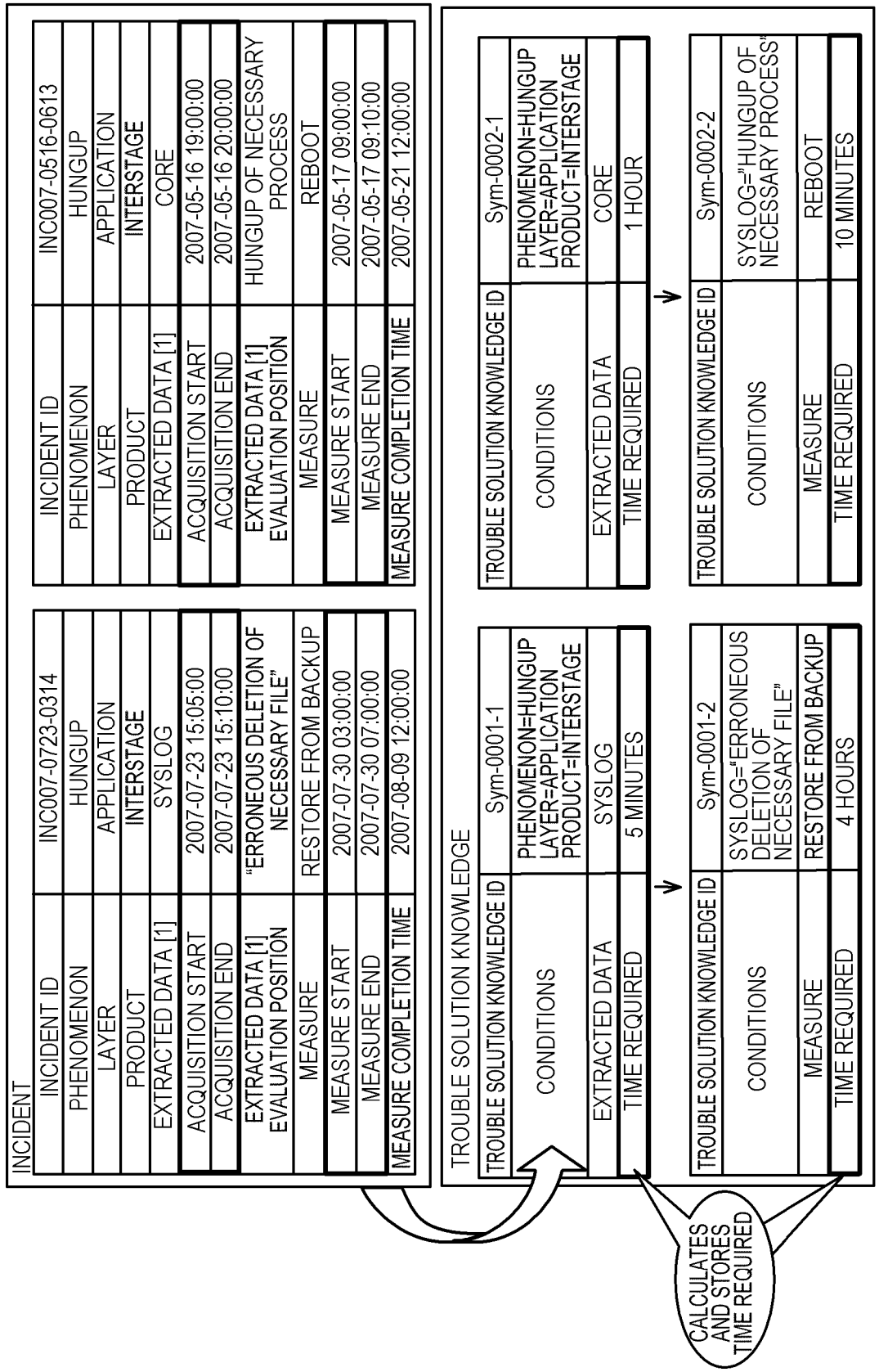
FIG. 6 illustrates an example of a process for generating the trouble solution knowledge from an incident.

Specific examples of the extracted data include "syslog" and "core" as described in an incident shown at the upper part of FIG. 6. "syslog" is an abbreviation of "system log". When a trouble occurs in the IT system, syslog is extracted first. Then, by reading syslog, an evaluation position in the extracted data corresponding to hardware or software of the IT system is located, and then, a proposal for a measure for the trouble is generated. This measure proposal is outputted under "measure". For example, "restore from backup" is displayed.

"Core" is a file created by recording the state of a program when the running program abnormally ends. In this file, the execution history of the program is stored. The data in the created file is read by core analysis software and displayed by a viewer. The core searches for an evaluation position in the executed program.

FIG. 3B illustrates a processing flowchart of risk registration procedure processed by the risk registration section. The flowchart shown in FIG. 3B will be described.

At step S1, trouble solution knowledge is read from the second storage section 17.

At step S2, risk values inputted by the administrator for the items of the trouble solution knowledge, that is, for the extracted data and measures for solving a trouble are received.

At step 3, the risk values received at step S2 are written in the trouble solution knowledge read at step S1.

FIG. 3C illustrates a solution knowledge after the risk registration by the risk registration section which the risk values have been added to the diagram illustrated in FIG. 3A.

Figure 4A:
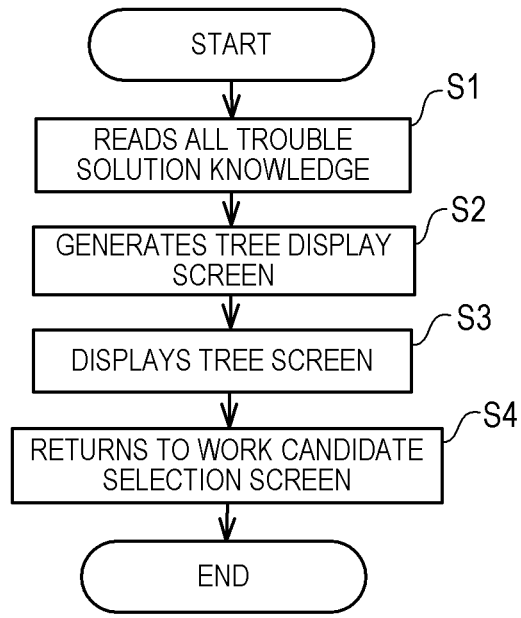
FIG. 4A illustrates a processing flowchart of solution procedure.

FIG. 4A illustrates a processing flowchart of solution procedure processed by the risk registration section 13 causing the solution procedure display section 14 to display the solution procedure.

The flowchart shown in FIG. 4A will be described.

At step S1, all the trouble solution knowledge is read from the second storage section 17.

At step S2, a work candidate tree display screen for displaying work candidates and risk values is generated.

At step S3, the tree display screen generated by execution of step S2 is displayed on the display.

At step S4, the flow returns to the work candidate selection screen shown in FIG. 2(A).

Figure 4B:
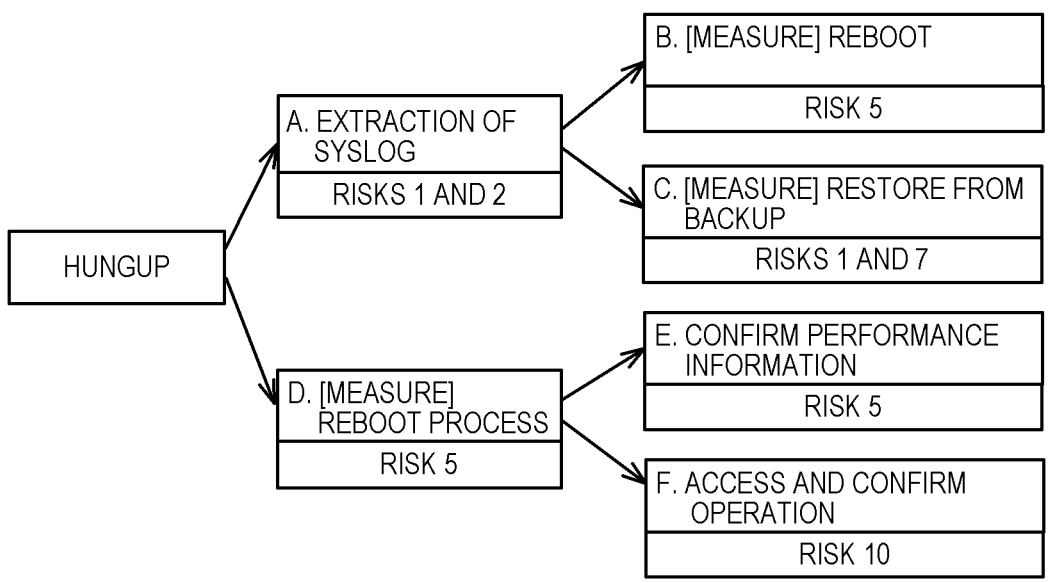
FIG. 4B illustrates an display example of a solution knowledge.

FIG. 4B illustrates an display example of a solution knowledge FIG. 4B illustrates the phenomenon of a problem, extracted data and measures for solving the trouble to which risk values are attached according to a solution procedure.

Figure 5:
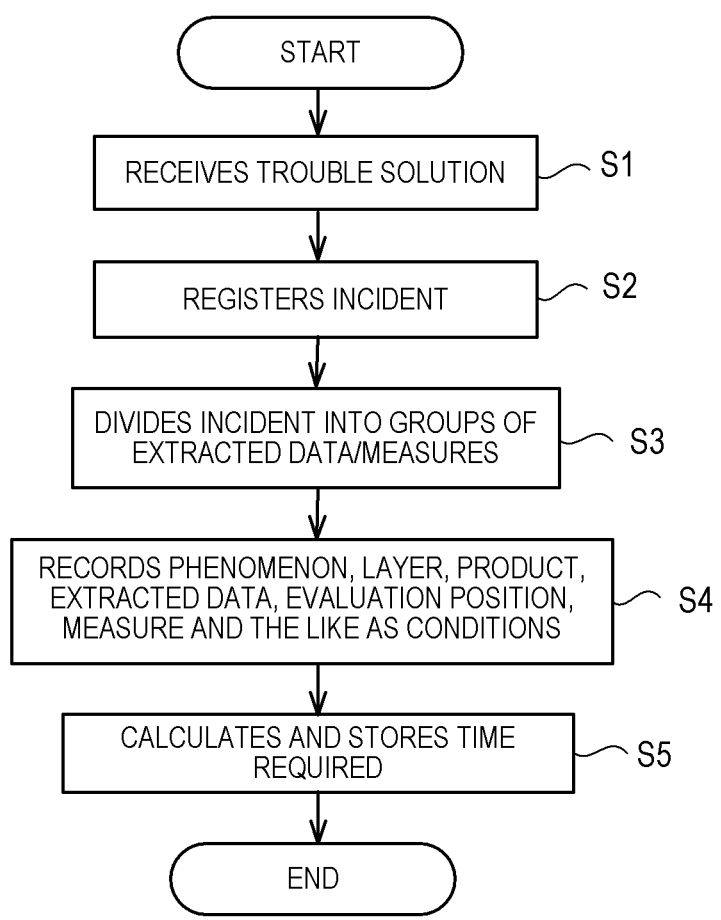
FIG. 5 illustrates a flowchart of a trouble solution knowledge creation procedure.

FIG. 5 illustrates a flowchart of a trouble solution knowledge creation procedure processed by the solution knowledge generation section 12. FIG. 6 illustrates an example of a process for generating the trouble solution knowledge from an incident. The flowchart shown in FIG. 5 will be described with reference to FIG. 6.

At step S1, a notification to the effect that a trouble has been solved is received from the administrator.

At step S2, the incident shown at the upper part of FIG. 6 is registered. Specifically, for example, information as shown below is written for an incident ID "INC007-0723-0314".
 phenomenon: "hungup"
 layer: "application"
 product: "Interstage"
 extracted data [1]: "syslog"
 extracted data [1] acquisition start date: "2007-07-23 15:05:00"
 extracted data [1] acquisition end date: "2007-07-23 15:10:00"
 evaluation position in extracted data [1]: "erroneous deletion of necessary file"
 measure: "restore from backup"
 measure start date: "2007-07-30 03:00:00"
 measure end date: "2007-07-30 07:00:00"
 measure completion date: "2007-08-09 12:00:00"
For an incident ID "INC007-0516-0163" also, similar description is made.

At step S3, the incident is divided into groups of extracted data and measures. Specifically, for example, the incident of the incident ID "INC007-0723-0314" is divided into groups as shown below.
 Group 1: "phenomenon", "layer", "product", "extracted data [1]", "extracted data [1] acquisition start date" and "extracted data [1] acquisition end date"
 Group 2: "evaluation position in extracted data [1]", "measure", "measure start date", "measure end date" and "measure completion date"

At step S4, "conditions" in trouble solution knowledge are created on the basis of the "phenomenon", "layer", "product" and "evaluation position in extracted data [1]" of the incident, and "extracted data" and measures in the trouble solution knowledge are created on the basis of "extracted data" and "measures" of the incident. In this case, description is made for each of the groups divided at step S3. Specifically, with reference to the incident ID "INC007-0723-0314", a trouble solution knowledge ID "Sym-0001-1" is created, "phenomenon=hungup", "layer=application" and "product=Interstage" are written under "conditions", and "syslog" is written under "extracted data". Similarly, a trouble solution ID "Sym-0001-2" is created, "syslog=erroneous deletion of necessary file" is written under "conditions", and "restore from backup" is written under "measures".

At step S5, time required is calculated from the incident shown at the upper part of FIG. 6, and the time required which has been calculated is stored into the trouble solution knowledge shown at the lower part of FIG. 6. Specifically, for example, the time required "5 min" and the time required "4 hours" are written under the trouble solution knowledge ID's "Sym-0001-1" and "Sym-0001-2", respectively. Under trouble solution knowledge ID's "Sym-0002-1" and "Sym-0002-2" also, similar description is made.

The risk registration section 13 sets time required, cost, occurrence probability or probability as risk items in the solution knowledge, and stores the solution knowledge into the second storage section 17 of the auxiliary storage.

The risk registration section 13 may also set any multiple risk items, among time required, cost, probability and occurrence probability, as risk items in the solution knowledge and store the solution knowledge into the second storage section 17 of the auxiliary storage.

Figure 7:
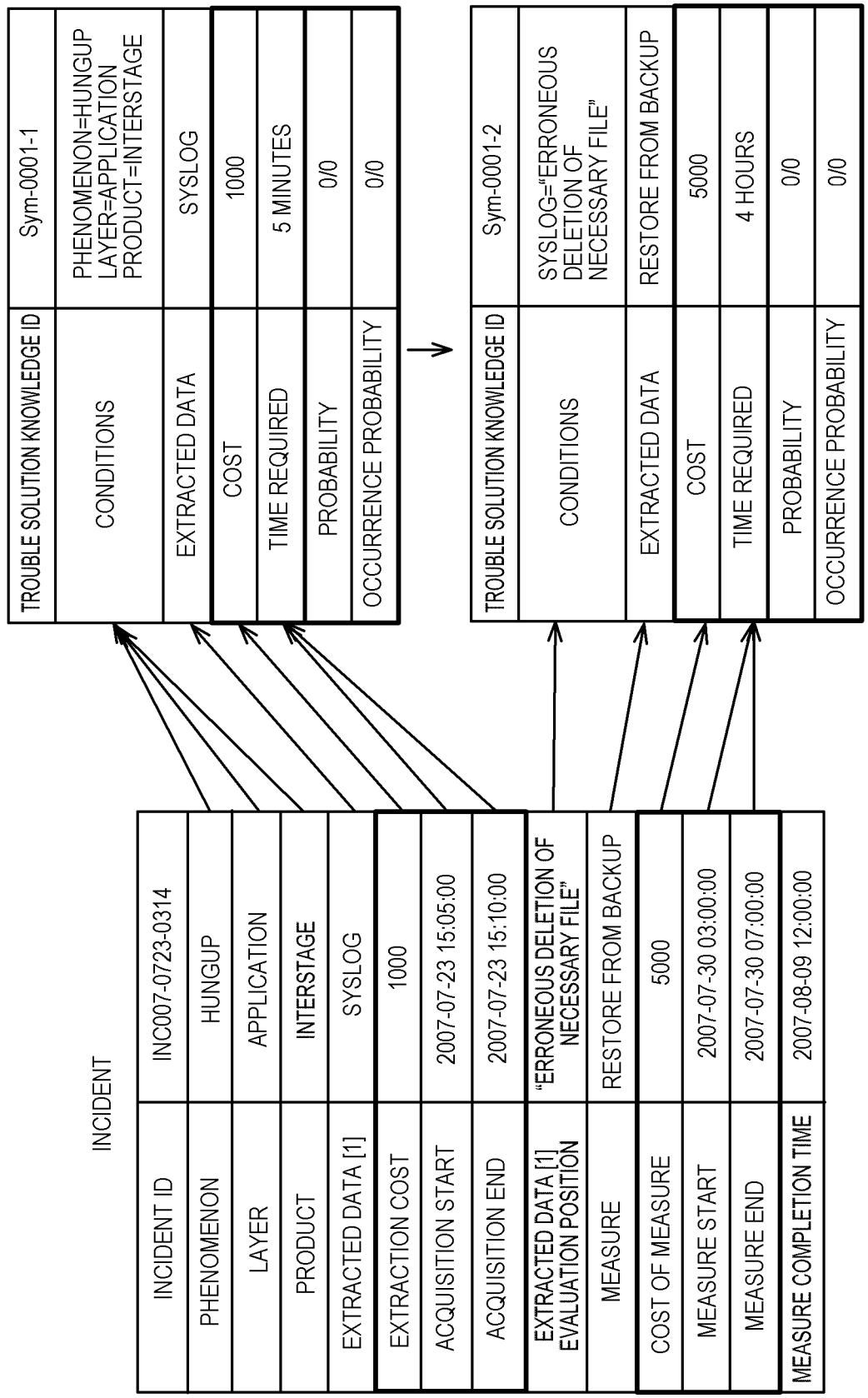
FIG. 7 illustrates an example of a process for generating the trouble solution knowledge from an incident including two risk items of cost and time required.

FIG. 7 illustrates an example of a process for generating the trouble solution knowledge from an incident including two risk items of cost and time required.

At step S5 in the flowchart illustrated in FIG. 5, cost and time required are calculated from the incident illustrated at the left side of FIG. 7, in which two risk items of cost and time required are included for the extraction of data and the measure, and the cost and the time required which have been calculated are stored into the trouble solution knowledge illustrated at the right side of FIG. 7.

Figure 8B:
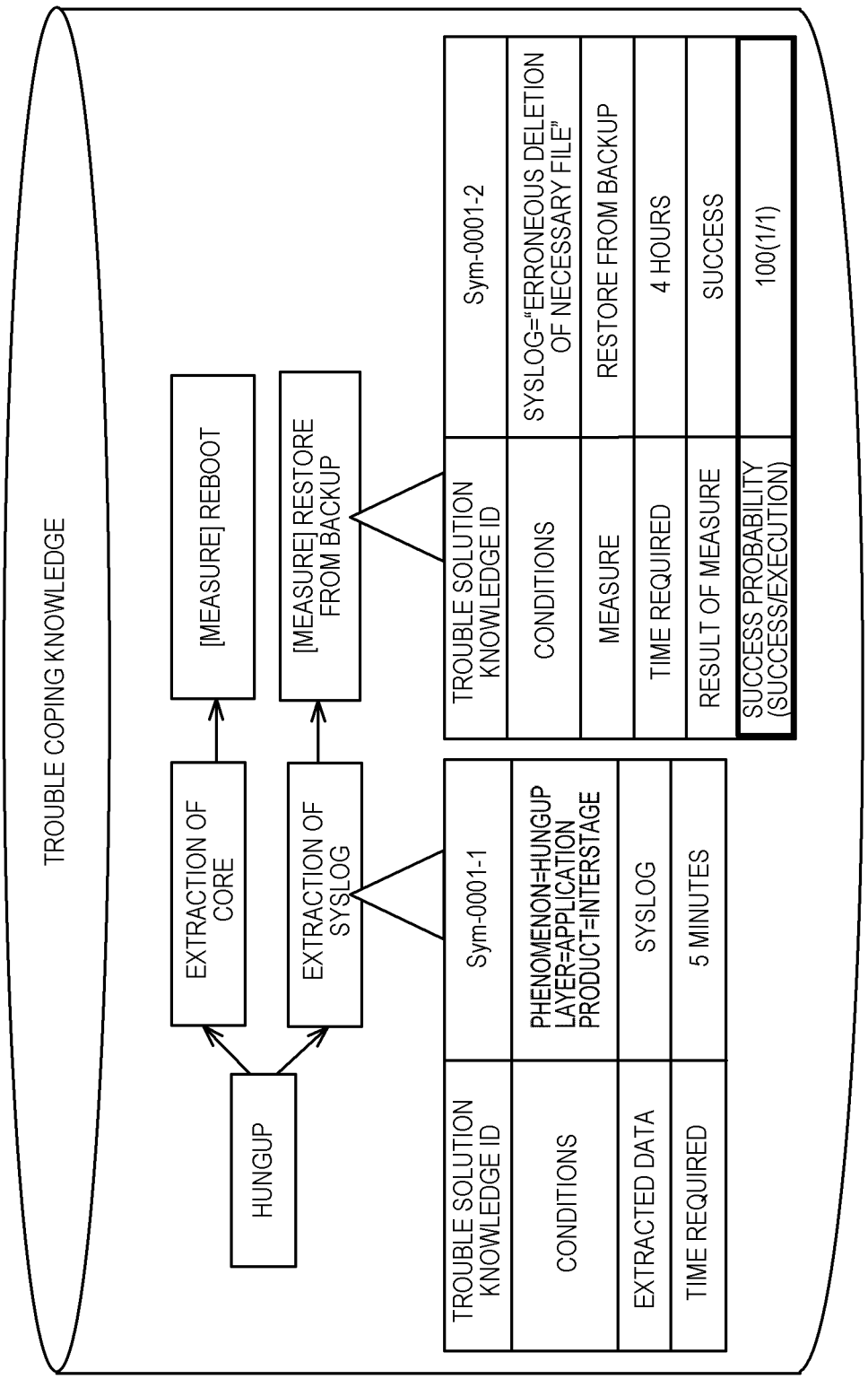
FIG. 8B illustrates relationship among a visualized flow of success probability calculation during operations management of an IT system, an example of first trouble solution knowledge, and an example of second trouble solution knowledge.

FIG. 8A illustrates an example of an incident. FIG. 8B illustrates relationship among a visualized flow of the success probability calculation during operations management of an IT system, an example of first trouble solution knowledge, and an example of second trouble solution knowledge. The upper part of FIG. 8B illustrates a visualized flow of the calculation process. The lower left diagram illustrates first trouble solution knowledge, and the lower right diagram illustrates second trouble solution knowledge. Success probability is automatically calculated with the use of incident history.

As illustrated in FIG. 8A, all the history of following the flow is recorded in the incident. The only the last recorded measure is a successful measure, and that the measure recorded from the beginning to the middle part is a failed measure in the history.

As illustrated at the upper part of FIG. 8B, the phenomenon of a trouble of the IT system is "hungup", the extracted data are "core" and "syslog", and "core" and "syslog" show measures "reboot" and "restore from backup", respectively.

As illustrated at the lower left and the lower right of FIG. 8B, trouble solution knowledge of the extraction of data "syslog" and the measure "restore from backup" which succeeded last is left. There are three kinds of trouble solution knowledge of an IT system, that is, extraction of data, a measure, the result of the measure confirming whether trouble solution has succeeded or failed by the measure (extraction of data/measure/measure result). The measures are located at the end of the tree shown at the upper part of FIG. 8B. The success probability exists only in such trouble solution knowledge that the measure has succeeded.

Figures 9A, 9B:
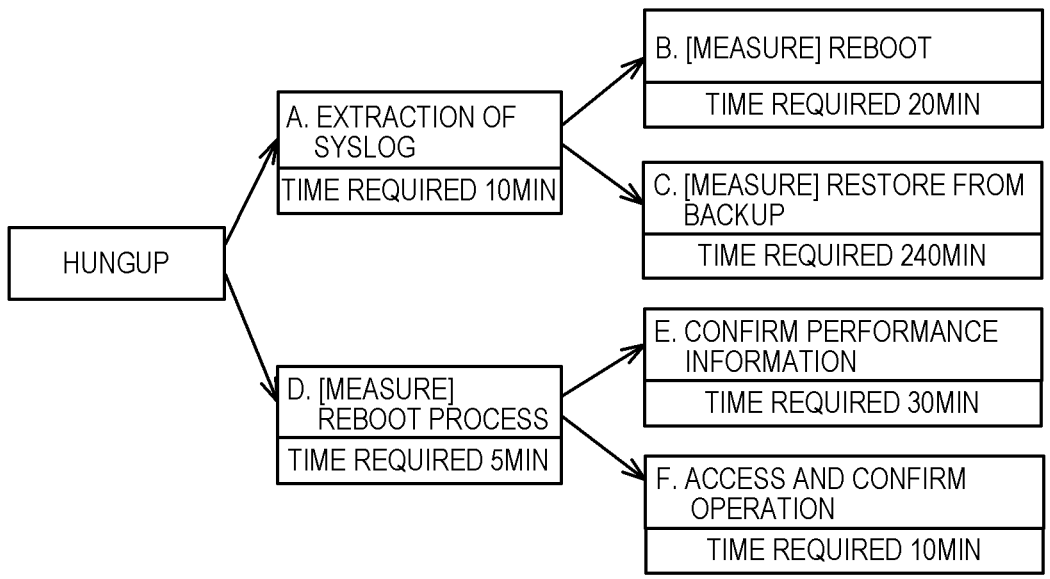
FIG. 9A illustrates a display example of candidates for the next work in the case of having selected time required as a risk item.
FIG. 9B illustrates a display example of a solution procedure having selected time required as a risk item.

FIG. 9A illustrates a display example of candidates for the next work in the case of having selected time required as a risk item. FIG. 9A illustrates the time required for extraction of data "syslog" and the measure "reboot process" as work candidates. Looking at this, the IT system administrator can select the measure "reboot process" if he wants to shorten the time required for trouble solution.

FIG. 9B illustrates a display example of a solution procedure having selected time required as a risk item. The information of display example illustrated in FIG. 9B will be described.

The extracted data and the measure illustrated in FIG. 9A.

For the extracted data "syslog", two measures "reboot" and "restore from backup", and the time required for these measures For the measure "reboot process", two items for confirmation, "confirm performance information" and "access and confirm operation", and the time required for these items for confirmation, 30 minutes and 10 minutes.

Looking at this information, the IT system administrator can select the measure "access and confirm operation" if he wants to make the time required for trouble solution the shortest.

Figures 10A, 10B:
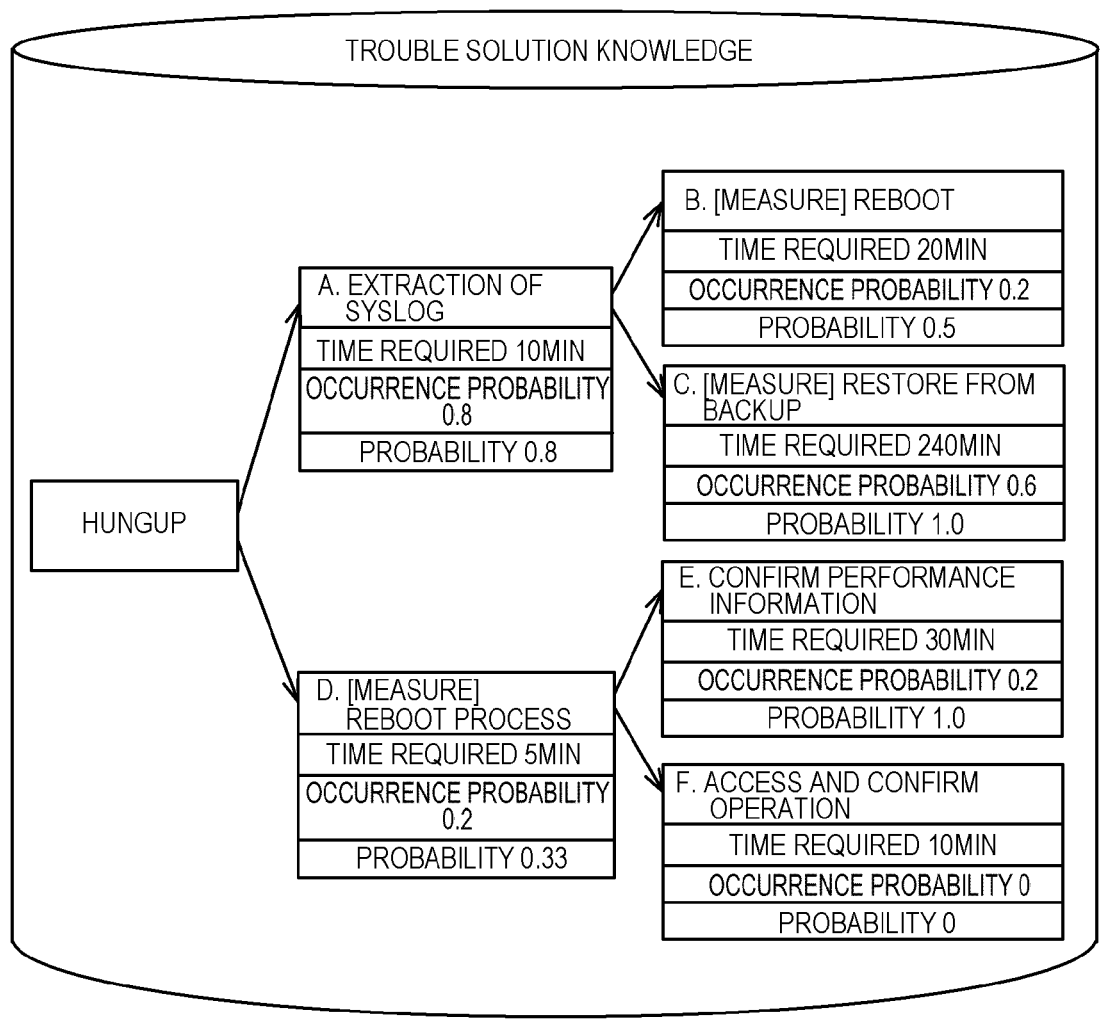
FIG. 10A illustrates a display example of candidates for the next work in the case of having selected time required and occurrence probability as risk items.
FIG. 10B illustrates an display example of a solution procedure in the case of having selected time required and occurrence probability as risk items.

FIG. 10A illustrates a display example of candidates for the next work in the case of having selected time required and occurrence probability as risk items. Three kinds of methods for displaying the time required illustrated in FIG. 10A will be described below.

FIG. 10B illustrates an display example of a visualized flow of solution procedure in the case of having selected time required and occurrence probability as risk items. The visualized flow shown in FIG. 10B is stored in the second storage section 17 as trouble solution knowledge. The information of display example illustrated in FIG. 10B will be described.

First method: Only the time required for the next work is read from the second storage section 17 and displayed.

Extraction of syslog: 10 min

Reboot of process: 5 min

Second method: The longest time (Max) and the shortest time (min) required for work required until a trouble is solved are displayed.

Extraction of syslog: Max 250 min; Min 30 min

Reboot of process: Max 35 min; Min 15 min

Third method: Average time required for work required until a trouble is solved is displayed.

Extraction of Syslog:

$$10+20*(0.2/0.8)+240*(0.6/0.8)=27.5 \text{ min} \quad \text{formula (1)}$$

Reboot of Process:

$$5+30*(0.2/0.2)+10*(0/0.2)=35 \text{ min} \quad \text{formula (2)}$$

In the formula (1), the first term indicates the time 10 minutes required for the work candidate "extraction of syslog". The second term indicates the product of the time 20 minutes required for the work candidate "reboot" multiplied by 0.2/0.8, which is the occurrence probability ratio of the work candidate "reboot" to the work candidate "extraction of syslog." The third term indicates the product of the time 240 minutes required for the work candidate "restore from backup" multiplied by 0.6/0.8, which is the occurrence probability ratio of the work candidate "restore from backup" to the work candidate "extraction of syslog". The formula (2) is also calculated similar to the formula (1).

FIG. 10A illustrates a display example of a result of the case of using the third method displaying candidates for the next work on the display together with corresponding occurrence probabilities and priority rankings. The priority rankings are calculated by a policy registration section of a second embodiment to be described later with reference FIGS. 13 to 16. FIG. 10A illustrates an example in which the priority rankings are calculated in ascending order of time required, on the basis of time required.

FIG. 11A illustrates an example of a visualized flow of solution knowledge without a risk item in the case of having selected probability as a risk item. FIG. 11(A) illustrates a visualized flow of extracted data A, measures B to D, and the results of the measures E and F of solution knowledge for a trouble "hungup".

FIG. 11B illustrates an example of incidents in the past in the case of having selected probability as a risk item. In FIG. 11(B), there are illustrated incident numbers on the left column, trouble solution knowledge execution history on the central column, and the shortest success routes on the right column as an example of incidents in the past.

FIG. 11C illustrates an display example of a visualized flow as trouble solution knowledge in the case of having selected probability as a risk item adding to the visualized flow illustrated in FIG. 11A.

The probability will be described. Probability is defined to be probability of extraction of data and execution of a measure performed in the past leading to successful solution. The probability is calculated by dividing the number of successes by the number of executions. For example, referring to the execution history, A was executed under all the five incident numbers 1 to 5. Referring to the shortest success routes, A was effective under the four incident numbers 1, 2, 3 and 4. Therefore, the probability is calculated by 4÷5=0.8. The results of the possibilities calculated similarly are illustrated in FIG. 11C.

Next, the shortest success route will be described below. Such extraction of data, measures or results of measures that it would have been possible to lead to solution without executing the extraction of data, the measures or the results of measures in the solution process are excluded from the shortest success routes. That is, A under the incident number 5, for example, is excluded from the shortest success route. The calculation method is: the shortest route to reach the last item in the trouble solution knowledge execution history is selected.

FIG. 12A illustrates an example of a visualized flow of solution knowledge without a risk item in the case of having selected occurrence probability as a risk item. FIG. 12A illustrates a visualized flow of extracted data A, measures B to D, and the results of the measures E and F of the resolution knowledge for a trouble "hungup".

FIG. 12B illustrates an example of incidents in the past in the case of having selected occurrence probability as a risk item. In FIG. 12B, there are illustrated incident numbers on the left column, trouble solution knowledge execution history on the central column, and the shortest success routes on the right column as an example of incidents in the past.

FIG. 12C illustrates an display example of a visualized flow of trouble solution knowledge in the case of having selected occurrence probability as a risk item adding to a visualized flow illustrated in FIG. 12A.

Occurrence probability will be described. Occurrence probability is defined to be the frequency that solution was successful by executing the measure concerned among all the flows. The occurrence probability is calculated by the following formula (3).

$$\text{Occurrence probability}=\text{the number of successes}\div\text{the number of all incidents} \quad \text{formula (3)}$$

For example, referring to the shortest success routes, A was effective under the four incident numbers 1, 2, 3 and 4. Therefore, by dividing the number 4 by 5, the number of all the incidents, the occurrence probability is calculated by 4÷5=0.8. The result of the occurrence probabilities calculated similarly are illustrated in FIG. 12C.

Figure 13:
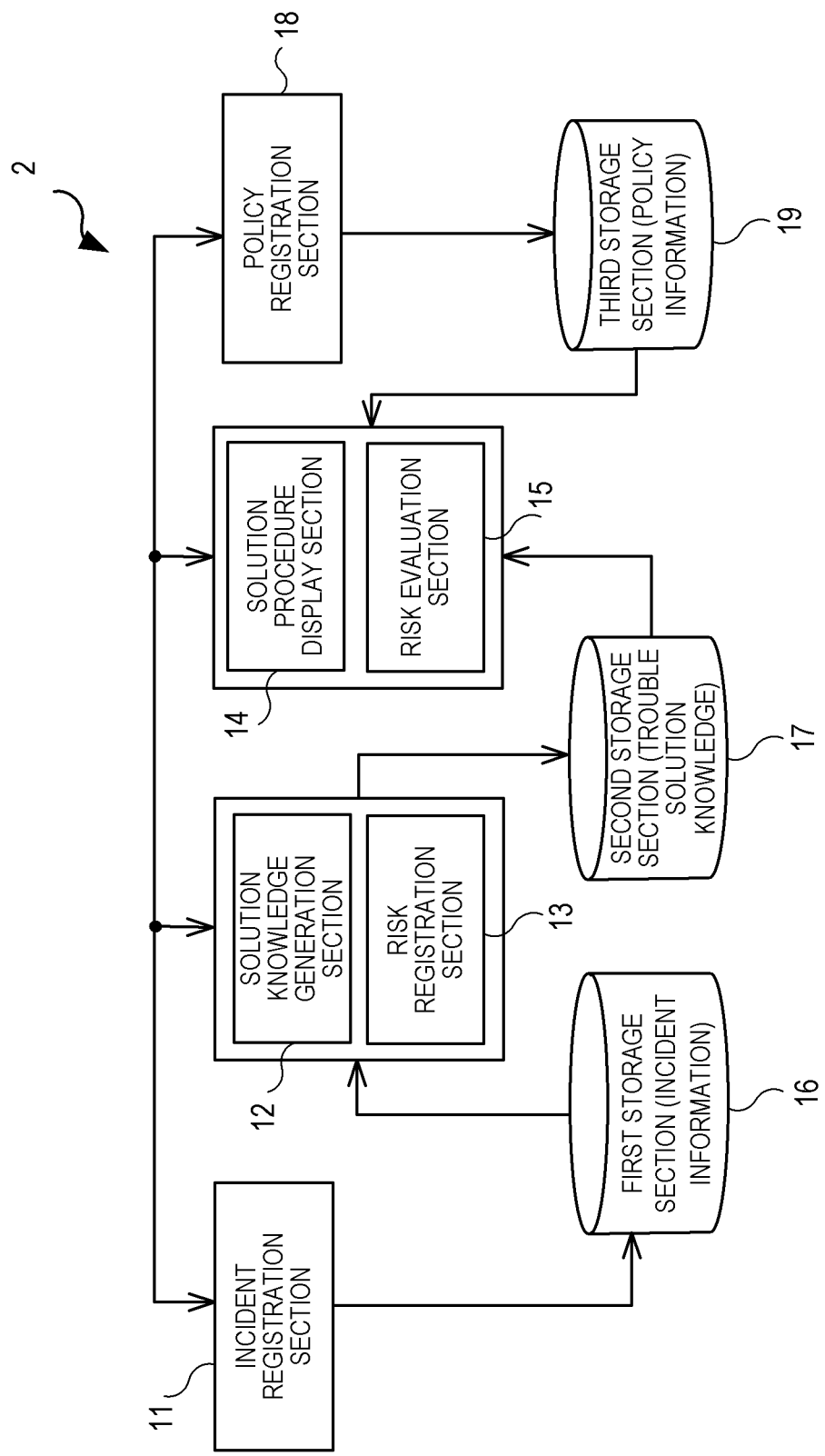
FIG. 13 illustrates a block configuration diagram of a trouble coping apparatus according to second embodiment.

FIG. 13 illustrates a block configuration diagram of a trouble coping apparatus according to second embodiment. The trouble coping apparatus (hereinafter referred to as a coping apparatus) 2 of an IT system for operations management illustrated in the whole of FIG. 13 is a computer apparatus provided with a CPU, a main storage (memory), an auxiliary storage (magnetic disk), an input interface connected to an input device such as a keyboard, and an output interface connected to an output device such as a display.

The coping apparatus 2 has an incident registration section 11, a solution knowledge generation section 12, a risk registration section 13, a solution procedure display section 14, a risk evaluation section 15, a first storage section 16, a second storage section 17, a policy registration section 18 and a third storage section 19. Since the incident registration section 11, the solution knowledge generation section 12, the risk registration section 13, the solution procedure display section 14, the risk evaluation section 15, the first storage section 16 and the second storage section 17 are similar to those of the trouble coping apparatus of the first embodiment shown in FIG. 1, description thereof will be omitted.

The policy registration section 18 registers which risk items among multiple risk items are to be adopted, and the priority rankings of the adopted risk items in order to determine a solution procedure. Furthermore, the policy registration section 18 weights the registered risk items among the multiple risk items.

In the third storage section 19, there is stored policy information about which risk item is to be adopted as an evaluation policy among the risk items of time required, success probability (probability), occurrence probability (frequency of taking the measure) and cost.

Figure 14:
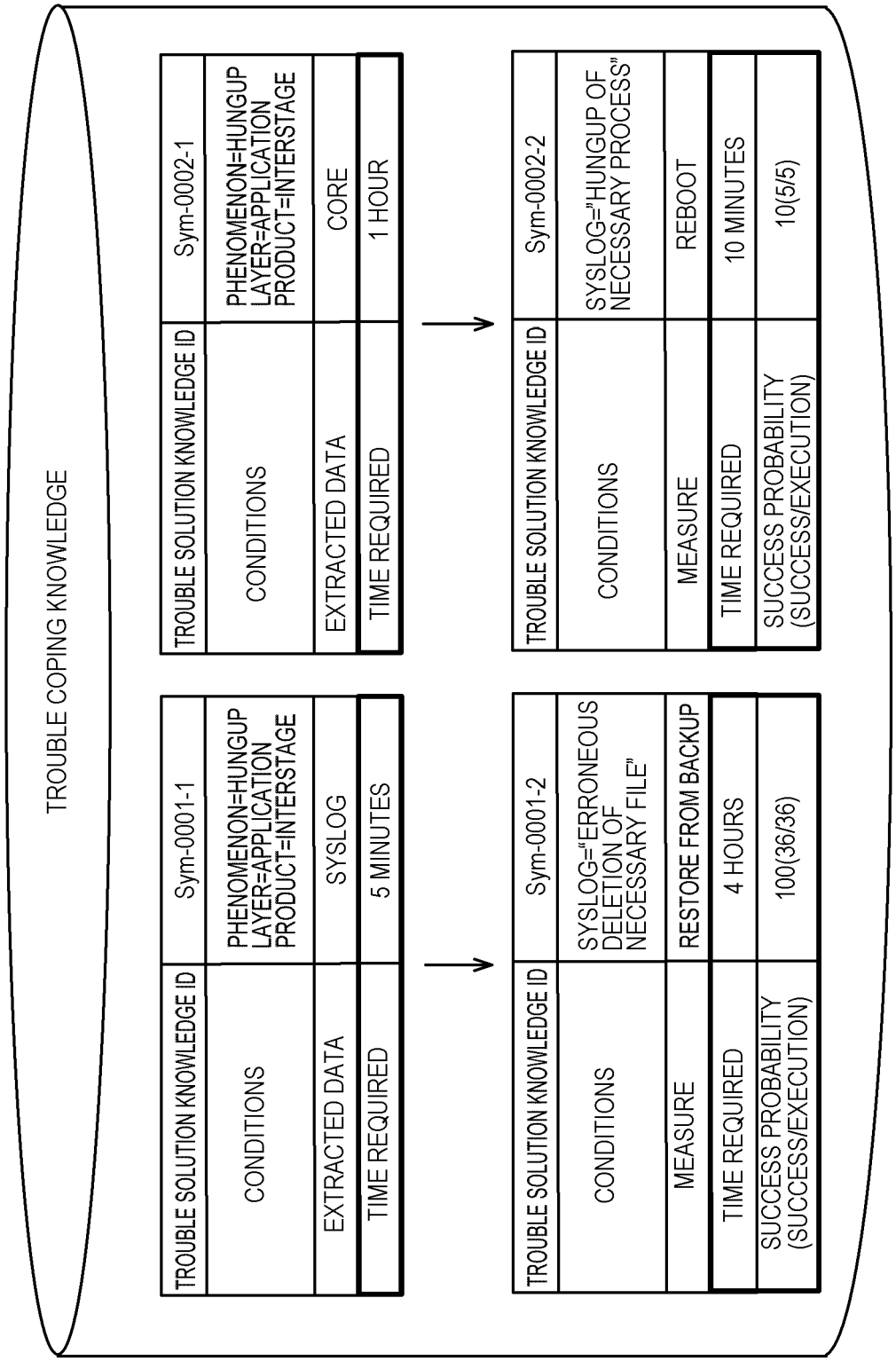
FIG. 14 illustrates an example of trouble coping knowledge.

FIG. 14 is a diagram showing trouble coping knowledge. Each item of trouble solution knowledge about extracted data "syslog" at the upper left, trouble solution knowledge about extracted data "core" at the upper right, trouble solution knowledge about a measure "restore from backup" at the lower left, and trouble solution knowledge about a measure "reboot" at the lower right is stored in the second storage section 17. In the trouble solution knowledge at the upper part, data of an identification number, conditions, extracted data and time required is stored. In the trouble solution knowledge at the lower part, data of an identification number, conditions, a measure, time required and success probability is stored.

Figure 15:
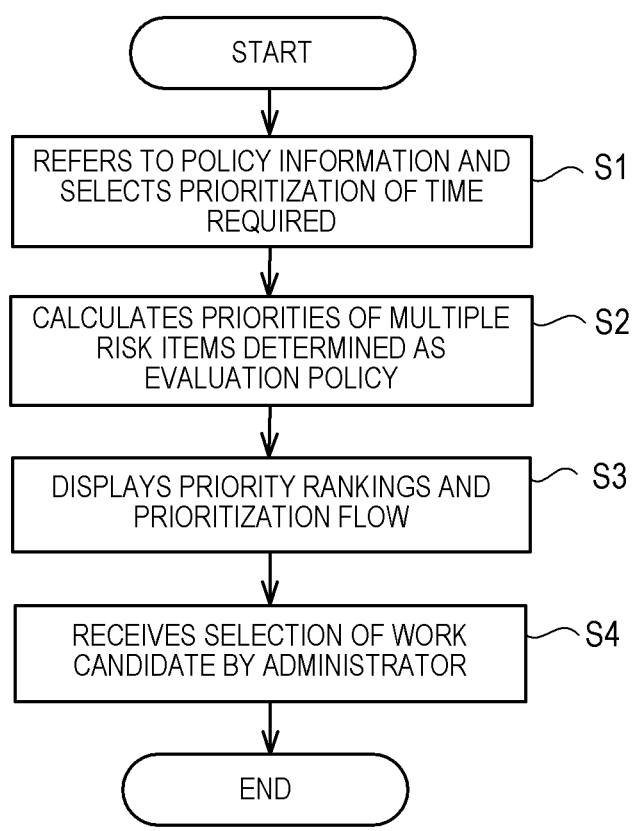
FIG. 15 illustrates a flowchart of the priority order determination procedure.

FIG. 15 illustrates a flowchart of the priority order determination procedure processed by a policy registration section. FIG. 16A illustrates a display example for selecting the priority order of evaluation policies;

FIG. 16B illustrates a display example of a visualized flow of solution procedure in the case of having added time required and probability (success probability);

FIG. 16C illustrates a display example of a next work candidate in the case of having added time required and probability (success probability).

The flowchart shown in FIG. 15 will be described with reference to FIG. 16A, FIG. 16B and FIG. 16C.

At step S1, by referring to the policy information, it is selected whether success probability or time required is to be prioritized as an evaluation policy. Specifically, an administrator determines that, for example, time required is to be prioritized as an evaluation policy, on the display illustrated in FIG. 16A.

At step S2, the priority degrees of the multiple risk items determined as evaluation policies are calculated. Here, it is assumed that time required is selected as a risk item. As illustrated in FIG. 16B and FIG. 16C, on the basis of the calculation result, "extraction of core" is given the first priority, and "extraction of syslog" is given the second priority according to ascending order of the length of the time required.

Here, a method for normalizing and calculating priorities from multiple risk items.

Weights to be given to cost, time required, success probability (probability) and occurrence probability (frequency of taking the measure) as risk items are inputted as evaluation policies in advance. The weights are assumed to be $\alpha$, $\beta$, $\gamma$ and $\delta$, respectively.

The average $\mu$ and the standard deviation $\sigma$ of each of the risk items (cost, time required, success probability (probability) and occurrence probability (frequency of taking the measure) relative to all the trouble solution knowledge are calculated. They are denoted by $\mu c$, $\sigma c$, $\mu t$, $\mu o$, $\sigma o$, $\mu p$ and $\sigma p$.

A normalization function is assumed to be: $f(x)=(x-\mu)/\sigma$.

The normalization function of the average $\mu c$ and the standard deviation $\sigma c$ is assumed to be fc.

The normalization function of the average $\mu t$ and the standard deviation $\sigma t$ is assumed to be ft.

The normalization function of the average $\mu o$ and the standard deviation $\sigma o$ is assumed to be fo.

The normalization function of the average $\mu p$ and the standard deviation $\sigma p$ is assumed to be fp.

The cost, time required, probability (success probability) and occurrence probability (frequency of taking the measure) of a symptom concerned are denoted by c, t, o and p, respectively.

In this case, a higher priority is better. The priority is calculated by the following formula (4).

$$\text{Priority} = -\alpha fc(c) - \beta ft(t) + \gamma fo(o) + \delta fp(p) \qquad (4)$$

At step S2, the policy registration section 18 can set weights $\alpha$, $\beta$, $\gamma$ and $\delta$ for the registered risk items among the multiple risk items.

At step S3, priority rankings and a prioritization flow are displayed to the administrator on the display. Specifically, the visualized flow shown in FIG. 16(B) is displayed to the administrator.

At step S4, work candidates determined by the administrator are received. Specifically, the administrator determines "extraction of core" and "extraction of syslog" shown in FIG. 16(B) as the first priority work and the second priority work, respectively. Alternatively, the administrator determines "reboot" and "restore from backup" shown in FIG. 16(C) as the first priority work and the second priority work, respectively.

According to the embodiments described above, when, from the phenomenon and the like of a trouble in an IT system, trouble solution knowledge for identifying the cause of the trouble is generated, material(s) for judging appropriateness of selection of a work candidate, such as time required, cost, occurrence probability and probability, are registered, and navigation information is generated from this trouble solution knowledge. Therefore, it is possible to judge appropriateness of a measure for a trouble and solve the trouble quickly.

Furthermore, when work candidates are selected from multiple work candidates for solving a problem in an IT system, risk items for preventing disadvantages being caused by failure in selection of a work candidate and the priority rankings of selected risk items are presented by the policy registration section. Thereby, even an administrator with little experience can appropriately judge selection of a work candidate, solve a trouble in an appropriate order, and shorten the time required for solving the trouble.

Furthermore, by visualizing the flow, it is possible to make more appropriate work candidate selection judgment.

Furthermore, by the policy registration section registering the priority rankings of the risk items and setting weights for the risk items, it is possible to select an evaluation policy and make more appropriate work candidate selection judgment.

A program implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD) and a magnetic tape (MT). Examples of the optical disk include a DVD (Digital Versatile Disc), a DVD-RAM, a CD-ROM (Compact Disc-Read Only Memory), and a CD-R (Recordable)/RW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A trouble coping apparatus comprising:
    a memory; and
    a processor to be coupled to the memory and execute a procedure including:
    registering information about an incident which has solved a trouble;
    generating trouble solution knowledge from the incident information;
    registering risk items which are characteristics of said incident that are usable to determine appropriateness of selection of a corresponding work candidate for solving the trouble, with the trouble solution knowledge;
    selecting at least two work candidates, along with risk items corresponding to the work candidates, registered in the trouble solution knowledge, for solving the trouble;
    generating navigation information showing a trouble solution procedure based on the selected work candidates and the corresponding risk items; and
    outputting the navigation information on a display to enable a user to select the work candidate for solving the trouble from the selected work candidates based on the risk items corresponding to the selected work candidates.

2. The trouble coping apparatus according to claim 1, wherein the registering of the risk items adds risk values indicating a degree of risk to the work candidates; and
    the navigation information includes the work candidates.

3. The trouble coping apparatus according to claim 1, wherein the navigation information includes a solution procedure showing the solution knowledge in a visualized flow.

4. The trouble coping apparatus according to claim 1, wherein the risk item candidates include cost with the solution knowledge.

5. The trouble coping apparatus according to claim 1, wherein the risk item candidates include probability with the solution knowledge.

6. The trouble coping apparatus according to claim 1, wherein the risk item candidates include occurrence probability with the solution knowledge.

7. The trouble coping apparatus according to claim 1, wherein the risk item candidates include any multiple risk items, among time required, cost, probability and occurrence probability, with the solution knowledge.

8. The trouble coping apparatus according to claim 1, the procedure further comprising:
    registering priority rankings among the multiple risk item candidates to select the risk item.

9. The trouble coping apparatus according to claim 8, wherein the registering the priority rankings weights registered risk items among the multiple risk item candidates.

10. The trouble coping apparatus according to claim 1, wherein risk item includes time required with the solution knowledge, the time comprising a maximum time and a minimum time and being calculated from the incident without input from a user.

11. The trouble coping apparatus according to claim 1, wherein the risk item includes time required with the solution knowledge, the time comprising an average time and being calculated from the incident without input from a user.

12. A trouble coping method comprising:
    registering information about an incident which has solved a trouble;
    generating trouble solution knowledge from the incident information;
    registering risk items which are characteristics of said incident that are usable to determine appropriateness of selection of a corresponding work candidate for solving the trouble, with the trouble solution knowledge;
    selecting at least two work candidates, along with risk items corresponding to the work candidates, registered in the trouble solution knowledge, for solving the trouble;
    generating navigation information showing a trouble solution procedure based on the selected work candidates and the corresponding risk items; and
    outputting the navigation information on a display to enable a user to select the work candidate for solving the trouble from the selected work candidates based on the risk items corresponding to the selected work candidates.

13. The trouble coping method according to claim 12, further comprising:
    registering priority rankings among the multiple risk item candidates to select the risk item.

14. The trouble coping method according to claim 13, wherein in the registration of the priority rankings, weights are given to registered risk items among the multiple risk item candidates.

15. A non-transitory computer-readable storage medium recording a trouble coping program causing a computer to perform a process comprising:
    registering information about an incident which has solved a trouble;
    generating trouble solution knowledge from the incident information;
    registering risk items which are characteristics of said incident that are usable to determine appropriateness of selection of a corresponding work candidate for solving the trouble, with the trouble solution knowledge;
    selecting at least two work candidates, along with risk items corresponding, to the work candidates, registered in the trouble solution knowledge, for solving the trouble;
    generating navigation information showing a trouble solution procedure based on the selected work candidates and the corresponding risk items; and
    outputting the navigation information on a display to enable a user to select the work candidate for solving the trouble from the selected work candidates based on the risk items corresponding to the selected work candidates.

16. The non-transitory computer-readable storage medium recording a trouble coping program according to claim 15, the process further comprising:

registering priority rankings among the multiple risk item candidates to select the risk item.

17. The non-transitory computer-readable storage medium recording a trouble coping program according to claim 16, the process further comprising:

weighting registered risk items among the multiple risk candidates.

* * * * *